Nov. 8, 1927.
R. T. HOSKING
1,648,347
CYLINDRICAL LOCK WASHER
Filed Nov. 10, 1926
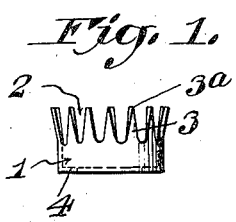
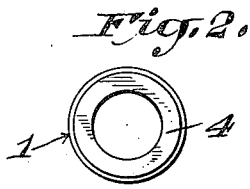
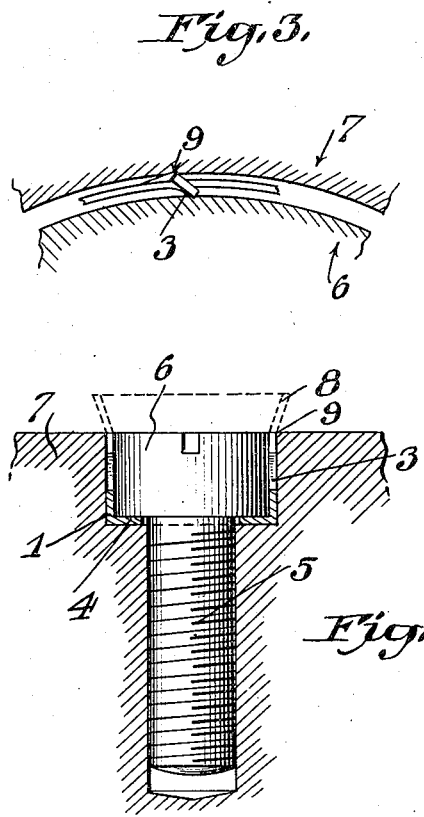
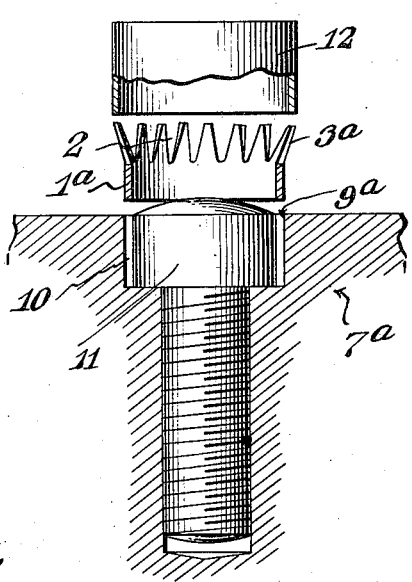
INVENTOR
RICHARD T. HOSKING
BY
George B. Willcox
ATTORNEY Patented Nov. 8, 1927.

1,648,347

UNITED STATES PATENT OFFICE.

RICHARD T. HOSKING, OF WILMETTE, ILLINOIS, ASSIGNOR, BY MESNE ASSIGNMENTS, TO SHAKEPROOF LOCK WASHER COMPANY, INCORPORATED, OF CHICAGO, ILLINOIS, A CORPORATION OF DELAWARE.

CYLINDRICAL LOCK WASHER.

Application filed November 10, 1926. Serial No. 147,517.

This invention relates to cylindrical lock washers and has for its object to provide a lock washer adapted to be inserted between the periphery of a cylindrical body and the wall of a cylindrical hole or bearing in which said body is to be locked against rotation in one direction. An example of such use is the locking of the cylindrical head of a fillister screw in a cylindrical hole in the work.

The mode of operation of this device, as regards its locking elements, is the same as in the lock washer described and claimed in my Patent No. 1,419,564, issued June 13, 1922, comprising a flat annular ring or washer body provided with prongs or teeth projecting radially outward. The teeth, which are of resilient material such as tempered steel, are of substantially the same width as thickness near their outer ends and are twisted axially, whereby any appreciable tendency to unscrew the nut or bolt head or other article to which the washer is applied causes the diagonal dimension of the cross section of each tooth to tend to roll and to thereupon become jammed as a strut between the work and the nut to act as a prop or strut tending to force the nut and the work apart by toggle-like action, and thereby locking the nut against unscrewing.

In my present improvement I utilize the scheme of rolling tooth action as set forth in the patent referred to, but adapt it to a different type of washer, capable of use on a class of bolt or screw heads and similar work for which the form of washer illustrated in the aforesaid patent is not suited.

In my co-pending application, Serial No. 9146, filed February 14, 1925, I have shown and described a washer having a conical body provided with locking teeth of the kind referred to, but here again the principle and mode of operation of the present invention differs materially from the washer therein described, as will be explained herein.

With the foregoing and certain other objects in view which will appear later in the specifications, my invention comprises the devices described and claimed and the equivalents thereof.

In the drawings Fig. 1 is a side view of a preferred form of my invention.

Fig. 2 is a bottom view.

Fig. 3 is a diagrammatic view, showing the manner of twisting the teeth.

Fig. 4 is a sectional view of a piece of work showing the washer applied to the cylindrical head of a cap screw.

Fig. 5 is a sectional view of a piece of work showing a modified form of the lock washer.

As is clearly shown in the drawings the device consists in a cylindrical body 1 of sheet metal formed with lengthwise slits 2 to provide spaced teeth 3 which are preferably wider at their roots than at their points and twisted as shown in Fig. 3. Preferably the twisted teeth have a very slight outward flare, as shown in Fig. 1.

In the preferred form of washer commonly employed for locking the cylindrical heads of cap screws, the end of the body 1 remote from the teeth 3 is formed with an inwardly projecting flange 4 having an opening to receive the body 5 of the cap screw. The body 1 is made to fit the cylindrical head 6 of the screw.

When the screw is tightened in the threaded aperture of the work 7 the washer teeth are drawn, along with the head 6, lengthwise into the hole in the work, as indicated by dotted lines at 8 in Fig. 4. The slight upward flare of the teeth 3 enables the washer to be slipped over the screw head easily, and causes the twisted working edges of the teeth to engage the edge 9 of the work as the washer is drawn down into the hole. The washer does not turn, that is, the flared teeth are drawn downwardly and inwardly without bodily rotation of the washer. Consequently the outwardly projecting edge 3ª of each tooth 3 forms for itself a slight longitudinal groove, starting at 9, in the wall of the recess of the work 7. When head 6 reaches its seat all of the teeth have been drawn down into the opening, the flare 8 has been destroyed and a part of the initial twist of each resilient tooth has been taken out, so that the tooth is in a partly sprung condition and as shown in Fig. 3 is in such position between the head 6 and the work 7 that any tendency to unscrew the bolt to loosen the screw by turning it in the reverse direction is immediately stopped by the rolling and locking action of the teeth in the manner described.

This mode of operation differs from the action of the conical washer shown in my copending application in the important particular that here the twisted teeth of the cylindrical washer have a practically straight lengthwise sliding contact with the wall of the work. When the washer is tightly seated the outer or twisted edge 3ª of each tooth is forcibly engaged with the wall of the work and is in a straight groove of its own making, thereby greatly increasing its power to resist unscrewing.

Referring now to the modified form shown in Fig. 5, 7ª represents the work formed with a bore 10, in which a cylindrical piece 11 is to be held against turning in one direction. The lock washer in this example is formed without any flange 4, such as was provided in the structure shown in Fig. 4, and consists merely of the cylindrical body 1ª and the twisted teeth.

In this instance the washer applied to the piece 11 may be pushed by any suitable means, as by a tubular mandrel, into the bore 10 of the work after the piece 11 has been seated. The mandrel is indicated in part cross section at 12, Fig. 5. In this example the action of the teeth 3ª on the shoulder 9ª is the same as in the form previously described, that is, the entrance of the sharp edged teeth, with their slight outward flare, starts the cutting of the groove at the outer edge 9ª of the wall of the opening and in its lengthwise movement the tooth follows the path thus established.

Having thus described my invention, what I claim and desire to secure by Letters Patent is:

1. A lock washer for securing a cylindrical body in the cylindrical hole of a piece of work, comprising a cylindrical shell having an end formed with an internal flange, the other end of said shell longitudinally slitted and provided with teeth of spring material, spaced apart, twisted and flared outwardly slightly with relation to the body of said shell, and adapted to be engaged between the work and the body to progressively cut substantially straight individual channels in the work while being drawn into said hole.

2. A lock washer for securing a cylindrical body in the cylindrical hole of a piece of work, comprising a cylindrical shell, an end of said shell provided with teeth of spring material spaced apart, twisted, and flared outwardly slightly with relation to the body of said shell, and adapted to be forcibly jammed in angular position between the work and the body and adapted to progressively cut small individual and substantially straight channels in the work while being forced into said hole.

In testimony whereof I affix my signature.

RICHARD T. HOSKING.